United States Patent [19]

Wakamatsu

[11] Patent Number: 4,715,651

[45] Date of Patent: Dec. 29, 1987

[54] DEVICE FOR INSTALLING SKIN ON AUTOMOTIVE SEAT

[75] Inventor: Fumio Wakamatsu, Okazaki, Japan

[73] Assignee: Aisin Seiki Kabushiki Kaisha, Aichi, Japan

[21] Appl. No.: 913,296

[22] Filed: Sep. 30, 1986

[30] Foreign Application Priority Data

Sep. 30, 1985 [JP] Japan .............................. 60-216986

[51] Int. Cl.⁴ .......................................... A47C 31/00
[52] U.S. Cl. .................................. 297/219; 297/452
[58] Field of Search ................ 297/452, DIG. 1, 218, 297/219; 5/470, 471

[56] References Cited

U.S. PATENT DOCUMENTS

| | | | |
|---|---|---|---|
| 2,191,848 | 2/1940 | Cramer et al. | 297/219 |
| 2,252,970 | 8/1941 | Gedris | 297/452 |
| 3,298,743 | 1/1967 | Albinson et al. | 297/452 |
| 3,844,614 | 10/1974 | Babbs | 297/452 |
| 4,065,182 | 12/1977 | Braniff et al. | 297/452 |
| 4,364,607 | 12/1982 | Tamburini | 297/452 |
| 4,568,124 | 2/1986 | Kanai | 297/DIG. 1 |

Primary Examiner—Francis K. Zugel
Attorney, Agent, or Firm—Sughrue, Mion, Zinn, Macpeak & Seas

[57] ABSTRACT

There is disclosed a device for uniformly stretching the skin of a seat of an automobile. The device has L-shaped projection portions mounted on the frame of the seat. Retaining members that engage the projection portions are disposed or formed on the fringe of the skin at intervals. The projection portions have flanges extending at right angles to the direction in which the skin is stretched. Notched portions are also provided on the frame adjacent to the projection portions. The retaining members have step portions that engage the flanges and notched portions of the frame.

2 Claims, 6 Drawing Figures

DEVICE FOR INSTALLING SKIN ON AUTOMOTIVE SEAT

FIELD OF THE INVENTION

The present invention relates to a device which maintains the skin on an automotive seat uniformly taut and which facilitates holding the skin to a frame.

BACKGROUND OF THE INVENTION

A seat used in an automobile comprises a seat pad mounted on the seat frame and a skin that covers the pad. The skin has clips stitched on its fringe. The clips engage protrusions formed on the outer periphery of the seat frame. In this way, the skin is held to the seat frame. The clips take a U-shaped form, while the protrusions on the outer periphery assume an L-shaped form in cross section. More specifically, the protrusions are formed by forming slits in the frame and then raising the portions surrounded by the slits. The clips are brought into engagement with the protrusions in the manner described below. First, the skin is stretched sufficiently so that the clips may go beyond the protrusions and that the U-shaped groove in each clip may face the vertical portion of the letter "L" of the corresponding protrusion. Then, the tension applied to the skin is reduced to permit the vertical portion of the letter "L" to engage the U-shaped groove.

In recent years, a new automobile seat has been produced in which a skin and a pad have been previously combined in a unit. Clips attached to the skin on its fringe are caused to engage protrusions formed on the outer periphery of a frame. Also in this case, the fringe of the skin is pulled so that it may go beyond the protrusions. In this way, a large force is needed when the skin is mounted on the frame. Further, when the clips are caused to engage the protrusions, the skin slackens, forming creases or wrinkles.

SUMMARY OF THE INVENTION

In view of the foregoing difficulties with the prior art techniques, it is the object of the invention to provide a device which permits one to easily attach a skin to a frame without producing creases or wrinkles.

The above object is achieved by a seat frame having grooved members provided with flanges that extend at right angles to the direction in which a skin is stretched, the skin having retaining members on its fringe, the retaining members engaging the flanges.

When the skin is stretched to the greatest extent, the step portions of the retaining members are brought into engagement with the flanges of the grooved members. Therefore, the skin hardly slackens. Also, what is needed is only to insert the retaining members into the grooved members. Furthermore, the skin can be readily installed on the frame, because the retaining members are inserted in the same direction as the direction in which the skin is stretched.

DETAILED DESCRIPTION OF THE INVENTION

Figure 1:
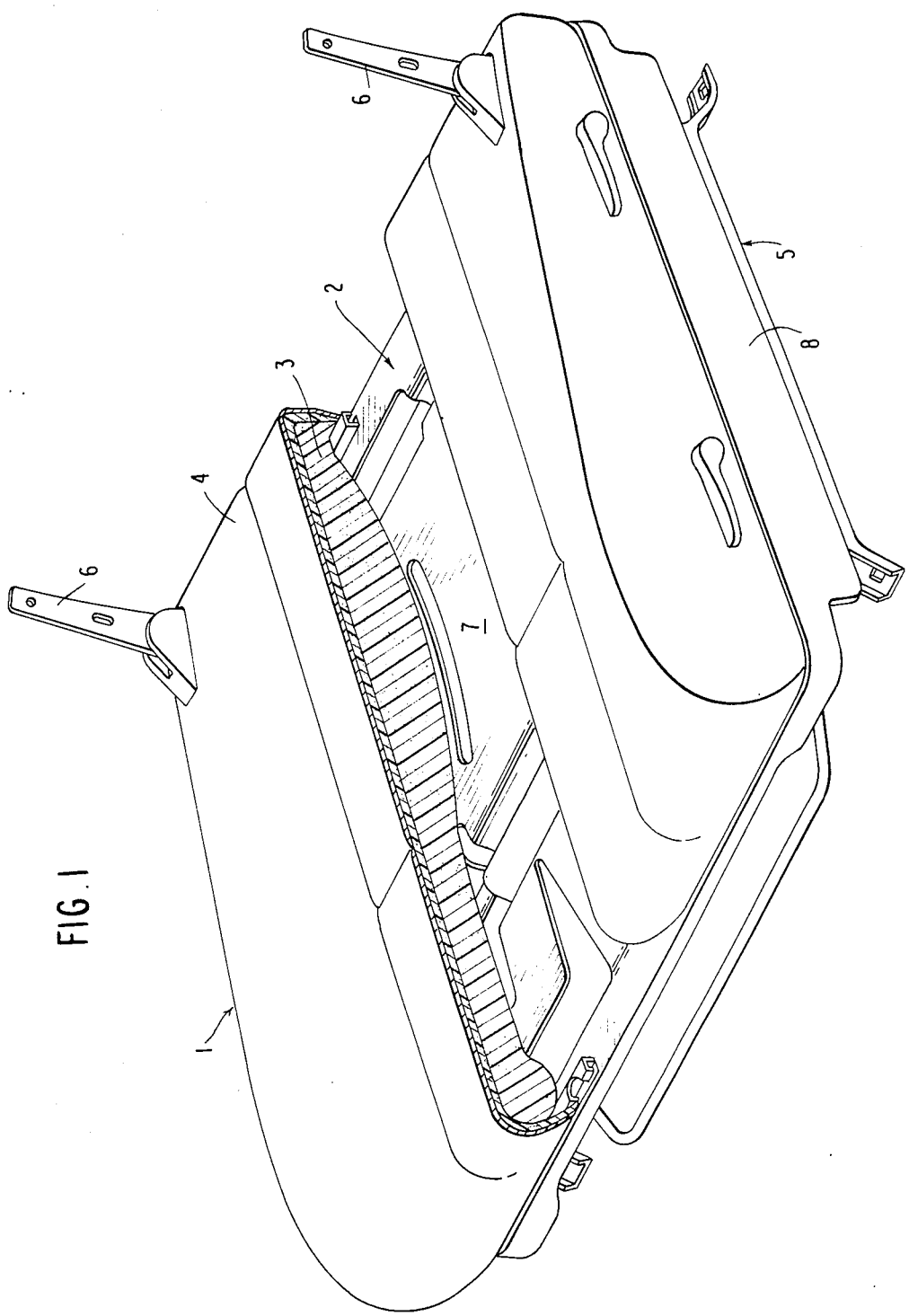
FIG. 1 is a perspective view of a seat cushion incorporating a device according to the invention.

Referring to FIG. 1, there is shown a seat cushion 1 incorporating a device according to the present invention. The cushion 1 comprises a frame 2, a seat pad 3, and a skin 4. The cushion 1 is held to a seat adjuster 5 that is rigidly fixed to the floor of an automobile. Upper arms 6 support the frame of a backrest (not shown) in such a way that the backrest can recline. The pad 3 and the skin 4 have been previously coupled together with adhesive or by high-frequency welding.

Figure 2:
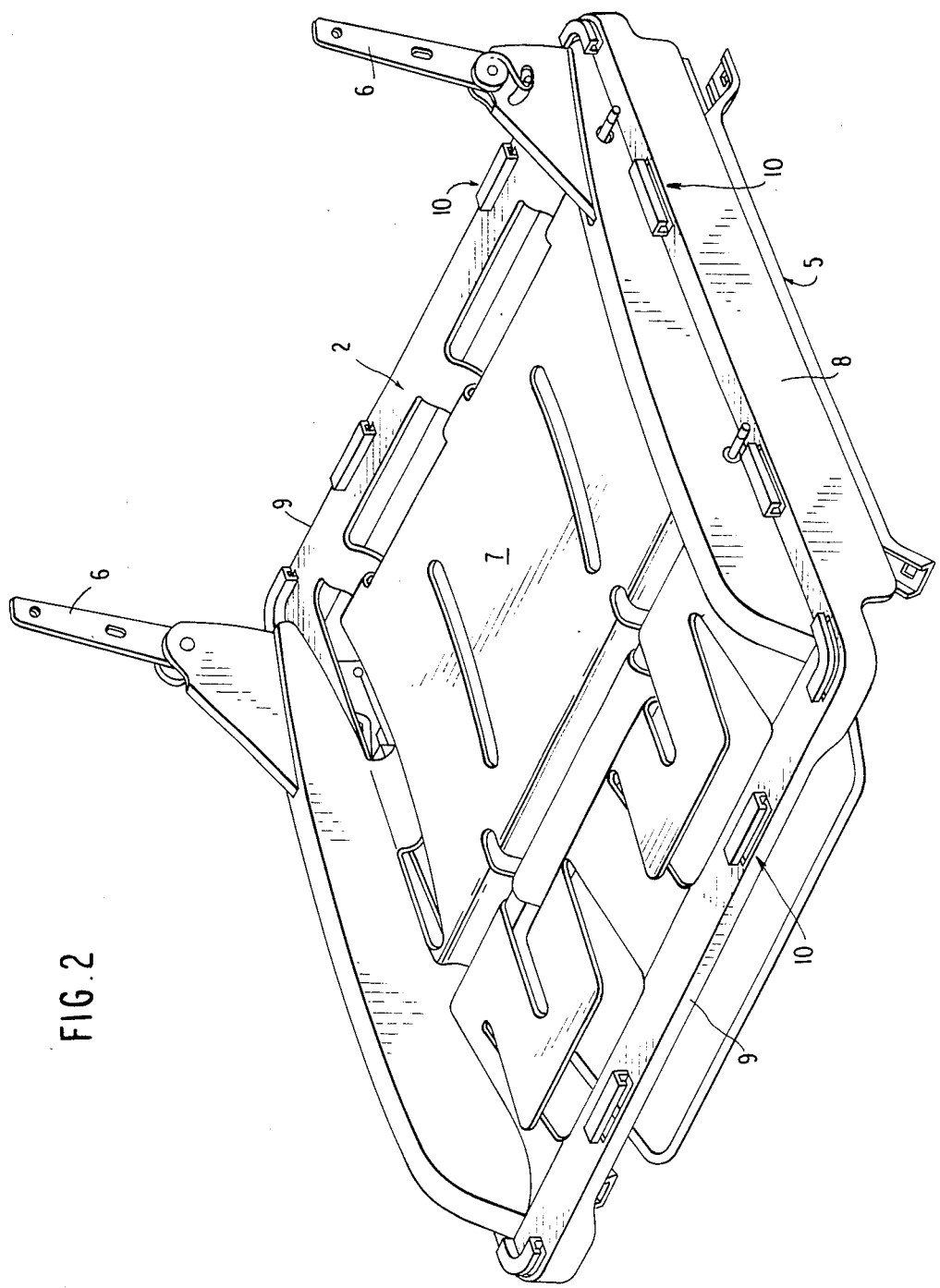
FIG. 2 is a perspective view of the seat frame shown in FIG. 1.
Figure 3:
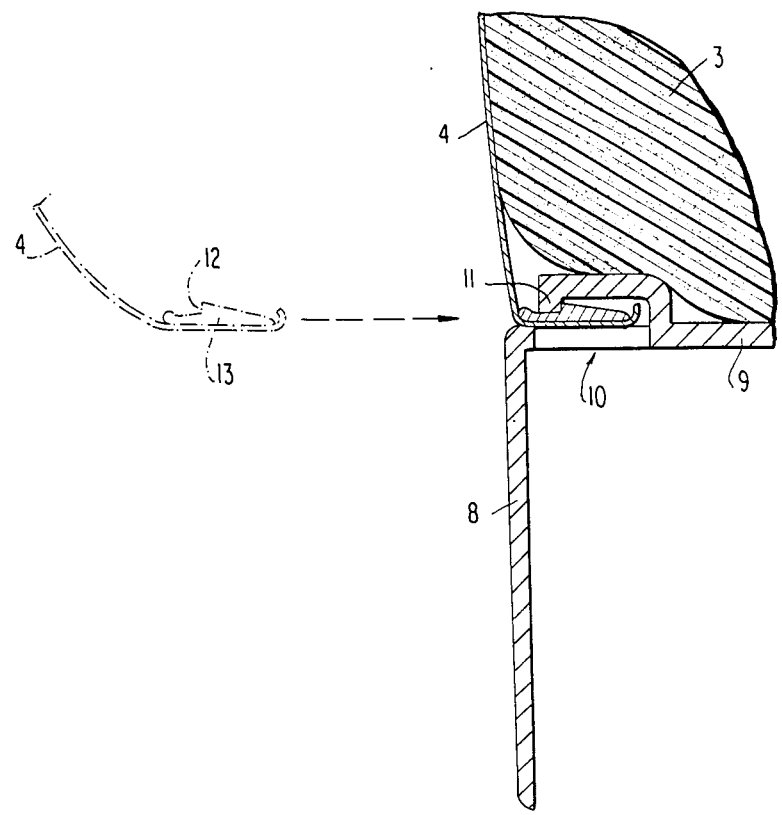
FIG. 3 is a fragmentary cross section of the seat cushion shown in FIG. 1, for showing one way in which a skin and the frame are mounted.

As shown in FIG. 2, the frame 2 that is molded from synthetic resin or light alloy has a top wall 7, garnishes 8, and frame portions 9. Grooved members 10 are disposed on the frame portions 9 at appropriate intervals. As shown in FIG. 3, each grooved member 10 assumes a substantially L-shaped form in cross section, has an opening on its one side, and is provided with a flange 11 extending downwardly. The skin 4 has retaining members 13 on its fringe, each member 13 having a step portion 12 that can engage the flange 11.

When the skin 4 is to be mounted to the frame 9, the retaining members 13 are inserted into the grooved members 10 from their openings. Then, the step portions 12 are brought into engagement with the flanges 11. Since the flanges 11 extend perpendicular to the direction in which the retaining members 13 can move, the skin 4 does not disengage from the frame 9. Also, the skin 4 does not slacken, because the step portions 12 come into engagement with the flanges 11 when a maximum tension is applied to the skin 4 while the retaining members are being inserted into the grooved members 10.

Figure 4:
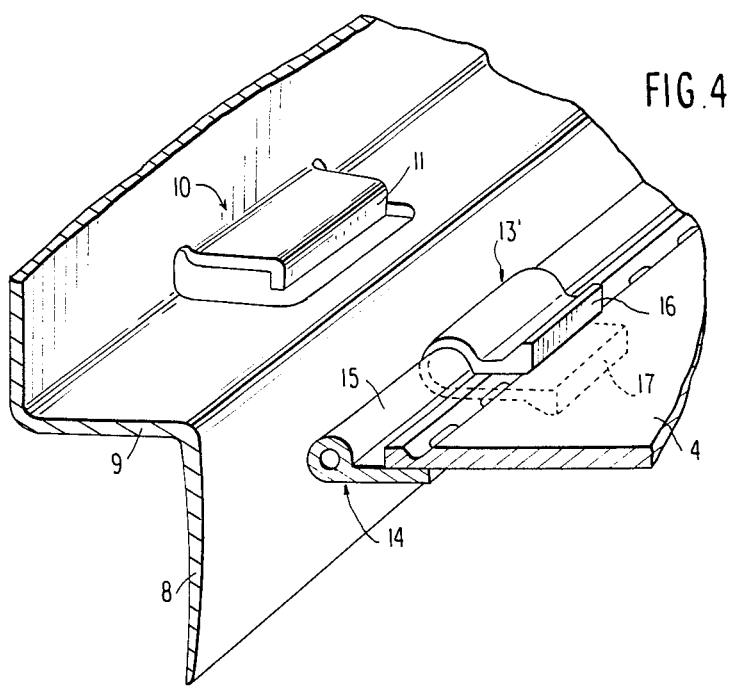
FIG. 4 is a fragmentary perspective view of another seat cushion, for showing another way in which a skin and the frame are mounted.
Figure 5:
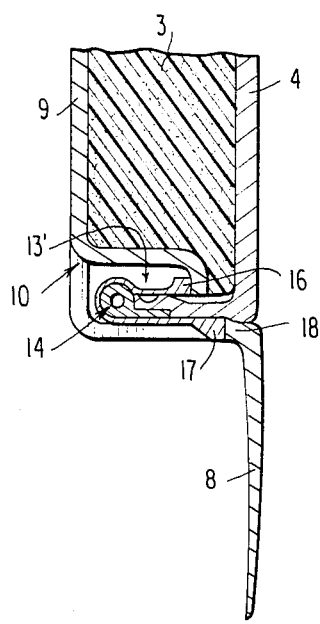
FIG. 5 is a fragmentary cross section of the seat cushion shown in FIG. 4, for showing one way in which the skin and the frame are mounted.

Referring next to FIGS. 4 and 5, there is shown another seat cushion that is similar to the cushion described above except that retaining members 13' are mounted on fringe members 15 instead of the retaining members 13. More specifically, fringe members 14 having cylindrical portions 15 are stitched to the fringe of the skin 4. The retaining members 13' each having a first step portion 16 and a second step portion 17 are forced into the cylindrical portions 15. Each retaining member 13' has a portion that fits over the cylindrical portion 15, and is slidable along the fringe member 14. When the retaining members 13' are inserted into the grooved members 10, the first step portions 16 abut against the flanges 11, and the second step portion 17 bear on the fringe 18 or notched portion of the frame. Thus, the skin 4 is prevented from disengaging at two locations. Of course, the fringe members 14 and the retaining members 13' can be welded together. In this case, they cannot make sliding motion relative to each other. The fringe members 14 and the retaining members 13' can be made from synthetic resin or light alloy.

Figure 6:
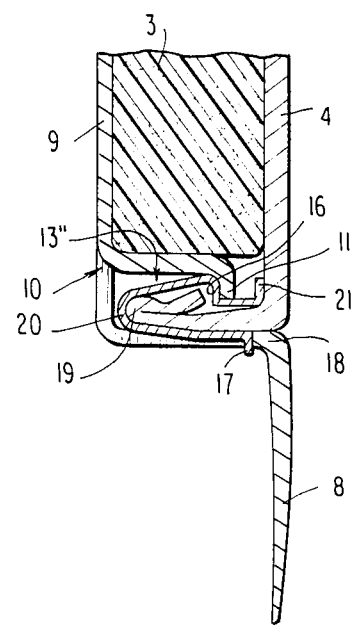
FIG. 6 is a view similar to FIG. 5, but showing another way in which the skin and the frame are mounted.

Referring next to FIG. 6, there is shown a further cushion that is similar to the cushions described above except for the following points. The fringe of the skin 4 is bent back and stitched into a cylindrical form 19 to which retaining members 13'' are attached. Each retaining member 13" has a first step portion 16 and a second step portion 17. Further, each retaining member 13" has a portion 20 that holds the cylindrical portion 19 of the skin 4. A flange 21 extending laterally outwardly from the first step portion 16 is flush with the pad 3. Therefore, it is possible to match the flatness of the skin 4 with the flatness of the frame 9. The first step portion 16 and the second step portion 17 bear against the flange 11 and the fringe 18 of the frame, respectively. Since it is only necessary that the retaining members be inserted into the grooved members, it is easy to install the skin to the frame. However, the skin does not disengage from the frame, because at least the step portions engage the flanges.

In the novel device, retaining members themselves or cylindrical fringe members are disposed along the fringe of a skin, and grooved members are mounted on a frame at appropriate intervals. Thus, the skin is stably stretched, resulting in less creases or wrinkles. Also, since the frame and garnishes are formed integrally, the skin can be always uniformly stretched, even if the width of the seat is large. In addition, it is easy to install the skin.

What is claimed is:

1. A device for installing a skin on a seat pad of an automobile seat having a frame comprising:

L-shaped projection portions (10) disposed on the frame of the seat and having flanges (11) extending at right angles to the direction in which the skin is stretched on a top portion of the seat pad;

a notched portion (18) formed on said frame adjacent each said projection portion wherein said flange of each projection portion and said notched portion each have a step-engaging face portion with a plane parallel to the direction of the extended flange; and retaining means (13) secured on an outer edge of the skin and engaging said projection portion, said retaining means having step portions engaging said step-engaging face portions of at least said flanges, wherein said retaining means comprises;

a fringe member (14) having a cylindrical portion contiguous with an end portion, said end portion being secured to the outer edge of said skin;

a retaining member (13') having a generally U-shaped cross section and having first and second step portions disposed on ends thereof, wherein said retaining member is forcibly fit over said cylindrical portion of the fringe member and slideable thereon, and first and second step portions engage said step engaging face portions of said flange and notch, respectively.

2. A device for installing a skin on a eat pad of an automobile seat having a frame comprising:

L-shaped projection portions (10) disposed on the frame of the seat and having flanges (11) extending at right angles to the direction in which the skin is stretched on a top portions of the seat pad;

a notched portion (18) formed on said frame adjacent each said projection portion wherein said flange of each projection portion and said notched portion each have a step-engaging face portion with a plane parallel to the direction of the extended flange; and retaining means (13) secured on an outer edge of the skin and engaging said projection portion, said retaining means having step portions engaging said step-engaging face portions of at least said flanges, wherein said retaining means comprises;

a retaining member (13") having a generally U-shaped cross section, said outer edge of the skin being folded back and stitched to comprise a thickened portion and said thickened portion being inserted into said retaining member and secured therein;

said retaining member having first and second leg extensions extending from each end thereof, said first leg having a first step portion (17) for engaging said notch in the frame, said second leg portion having a second step portion (16) for engaging said face portion of said flange and an extension therefrom having an L-shaped cross section contiguous with said second step portion and terminating in a third step portion that engages an interior surface of said skin.

* * * * *